3,390,155
**NOVEL 9,10 - DIHYDRO - 9,10-DIOXOANTHRA-
CENE-DIYL-BIS-(4'-CARBAMOYLPHTHALIC
ANHYDRIDES)**
John F. Santimauro, Wyckoff, N.J., and Herman Gerson,
New York, N.Y., assignors to Allied Chemical Corporation, New York, N.Y., a corporation of New York
No Drawing. Filed Dec. 2, 1966, Ser. No. 598,592
3 Claims. (Cl. 260—346.3)

ABSTRACT OF THE DISCLOSURE

Dianhydrides derived from trimellitic acid and diaminoanthraquinones which are useful as intermediates for the preparation of pigments and polyesters, and as curing agents for epoxy resins.

This invention relates to a new class of dianhydrides. More specifically, it relates to dianhydrides derived from trimellitic acid anhydrides and diaminoanthraquinones.

The novel compounds of this invention have the following general formula:

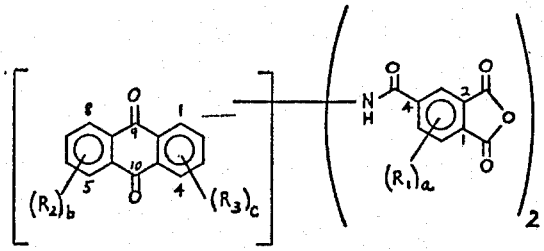

Wherein $R_1$, $R_2$, and $R_3$ independently represent hydrogen, halogen, nitro, trifluoromethyl, alkyl, alkoxy, dialkylamino, and dialkylsulfamyl radicals wherein the alkyl moieties on the aforementioned radicals contain from 1 to 6 carbon atoms; and $a$, $b$ and $c$ independently represent integers from 1 to 3.

The compounds of the present invention possess 2 sites of relatively high reactivity, namely, the anhydride groups. This makes them valuable intermediates in the preparation of a variety of useful materials. For example, these dianhydrides react with amines to form colored products which are useful as pigments. In addition, they react with glycols to form polyesters, and are also useful as curing agents for epoxy resins.

Our new compounds, which are 9,10-dihydro-9,10-dioxoanthracene - diyl - bis - (4' - carbamoylphthalic anhydrides), are prepared by heating a mixture of about two molecular equivalents of the monoacyl halide of a trimellitic acid anhydride having the formula:

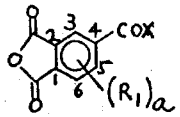

with about one molecular equivalent of a diaminoanthraquinone having the formula:

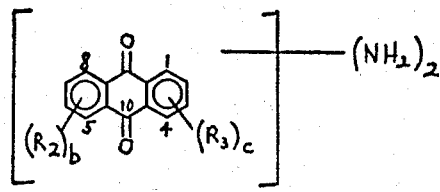

wherein X is a halogen radical, e.g., chlorine or bromine, and $R_1$, $R_2$, $R_3$, $a$, $b$, and $c$ are as defined above.

Although the reaction proceeds in the absence of a solvent, it is preferable to conduct the reaction in an inert organic liquid such as nitrobenzene, chlorobenzene, toluene, xylene, and the like. In addition to lowering the viscosity of the reaction system and facilitating the mixing of reagents, the use of a solvent will also serve to limit the maximum temperature of the system to the boiling point of the solvent. The reaction proceeds smoothly at temperatures between about 70° and 200° C., preferably at about 100° to 150° C. Hence the choice of solvent is governed to a large extent by the desired reaction temperature (i.e., reflux temperature of the solvent). Under these conditions, the reaction will be completed in about 5 to 48 hours. The higher the reaction temperature, the less time required. Upon cooling the reaction mixture, the dianhydride generally separates as a crystalline solid which may be collected by filtration, centrifugation, and the like. The crude product so isolated can be washed with alcohol and dried in vacuo. If desired, further purification can be effected by recrystallization from a suitable solvent, e.g., nitrobenzene. However, for most purposes further purification is unnecessary.

As indicated above, the process of our invention is carried out preferably in the presence of a non-reactive solvent. Since hydrogen halide is a by-product, it may be desirable in some instances to conduct the reaction in the presence of an acid scavenger, e.g., pyridine, N,N-dimethylaniline, sodium carbonate, and the like.

The diaminoanthraquinones suitable for use in this novel synthesis are generally known compounds which are readily available. The following list of such compounds is presented for purposes of illustration and is not meant to include all possibilities falling within the scope of the present invention.

1,2-diaminoanthraquinone
1,4-diaminoanthraquinone
1,5-diaminoanthraquinone
1,6-diaminoanthraquinone
1,7-diaminoanthraquinone
1,8-diaminoanthraquinone
2,3-diaminoanthraquinone
2,6-diaminoanthraquinone
2,7-diaminoanthraquinone
1,5-diamino-4-butylanthraquinone
1,4-diamino-2-methoxyanthraquinone
1,5-diamino-4,8-bis-(diethylamino)-anthraquinone
1,4-diamino-2-bromoanthraquinone
1,8-diamino-2-chloro-5-methoxyanthraquinone
1,6-diamino-4-(N,N-dimethylsulfamyl)-anthraquinone
2,6-diamino-3,7-dibromoanthraquinone
1,8-diamino-4,5-dichloroanthraquinone
1,4-diamino-6,7-dichloro-2-nitroanthraquinone
1,5-diamino-4-trifluoromethylanthraquinone Trimellitic acid anhydride (1,2,4-benzene-tricarboxylic acid, 1,2-anhydride) and its derivatives are generally known compounds. They are easily converted to acid chlorides by reaction with thionyl chloride or oxalyl chloride.

The following list of such compounds is presented for purposes of illustration and it too, is not meant to include all possibilities falling within the scope of the present invention.

trimellitic acid chloride, 1,2-anhydride
5-chloro-trimellitic acid chloride, 1,2-anhydride
3,5-dimethoxy-trimellitic acid bromide, 1,2-anhydride
5-ethoxy-3-methyl trimellitic acid bromide, 1,2-anhydride
5-(N,N-diethylamino)-trimellitic acid chloride, 1,2-anhydride
5-(N,N-dimethylsulfamoyl)-trimellitic acid chloride, 1,2-anhydride trichlorotrimellitic acid chloride, 1,2-anhydride
trimethyltrimellitic acid bromide, 1,2-anhydride Trimellitic acid chloride, 1,2-anhydride is preferred, since trimellitic acid anhydride is readily available.

The following examples are presented in order to more fully illustrate the nature of and method of practicing our invention. In these procedures parts are by weight and temperatures are in degrees centigrade.

Example 1

A mixture of about 420 parts of anhydrous nitrobenzene 48.4 parts (2 molecular equivalents) of trimellitic acid chloride, 1,2-anhydride, and 27.4 parts (1 molecular equivalent) of 1,5-diaminoanthraquinone was heated slowly to 125°. The resulting solution was maintained at about 125° for approximately 18 hours and then cooled to room temperature. The product crystallized and was collected by filtration, washed with cold alcohol and dried in air. The product, 9,10-dihydro-9,10-dioxoanthracene-1,5-diyl-bis-(4'-carbamoylphthalic anhydride), did not melt below 320°. It has the following formula:

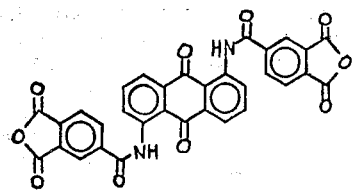

*Analysis.*—Calcd. for $C_{32}H_{14}O_{10}N_2$: C, 65.53; H, 2.41; N, 4.78. Found: C, 64.83; H, 2.60; N, 4.70.

Example 2

In a manner analogous to that described in Example 1 above, a mixture of about 425 parts of nitrobenzene, 2 molecular equivalents of 5-nitrotrimellitic acid chloride, 1,2-anhydride and 1 molecular equivalent of 1,8-diamino-4,5-dichloroanthraquinone is heated at about 120° to 130° for about 24 hours. The resulting product, isolated by the procedure in Example 1, is 9,10-dihydro-9,10-dioxo-4,5-dichloroanthracene-1,8-diyl-bis-(4'-carbamoyl -5' - nitrophthalic anhydride) which has the following formula:

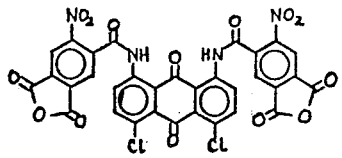

It can thus be seen that this invention provides a novel class of dianhydrides and an effective process for preparing them from known and available starting materials.

Although certain preferred embodiments of our invention have been disclosed for purposes of illustration, it will be evident that various changes and modifications in the specific details set out therein can be made without departing from the spirit and scope of the invention as set forth in the appended claims.

We claim:
1. Dianhydrides having the following formula:

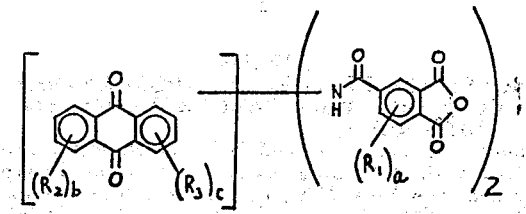

wherein:
a, b, and c each independently represents a member selected from the group of integers consisting of 1, 2 and 3; and $R_1$, $R_2$, and $R_3$ each independently represents a member selected from the group consisting of hydrogen, halogen, nitro, trifluoromethyl, alkyl, alkoxy, dialkylamino, and dialkylsulfamyl radicals, wherein the alkyl moieties on the forementioned radicals contain 1–6 carbon atoms.

2. A dianhydride according to claim 1 having the following formula:

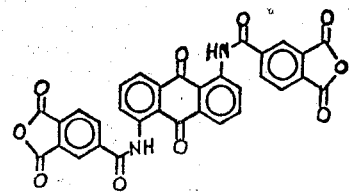

3. A dianhydride of claim 1 having the following formula:

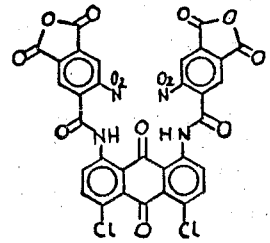

References Cited
UNITED STATES PATENTS
3,182,073    5/1965    Loncrini _____ 260—346.3

OTHER REFERENCES
Groggins, P. H.: Unite Processes in Organic Synthesis, N.Y. (1947), McGraw-Hill, p. 640.

Royals, E. E.: Advanced Organic Chemistry, Englewood Cliffs, N.J. (1954), Prentice-Hall, p. 617.

NICHOLAS S. RIZZO, *Primary Examiner.*

ALTON D. ROLLINS, *Examiner.*

B. I. DENTZ, *Assistant Examiner.*